UNITED STATES PATENT OFFICE.

JOHN A. JUST, OF SYRACUSE, NEW YORK, ASSIGNOR OF ONE-HALF TO D. H. BURRELL & COMPANY, OF LITTLEFALLS, NEW YORK, A FIRM.

ADHESIVE CASEIN AND PROCESS OF MAKING SAME.

SPECIFICATION forming part of Letters Patent No. 692,450, dated February 4, 1902.

Application filed April 17, 1901. Serial No. 56,301. (No specimens.)

*To all whom it may concern:*

Be it known that I, JOHN A. JUST, a citizen of the United States, and a resident of Syracuse, in the county of Onondaga and State of New York, have invented a new and useful Improvement in Adhesive Casein and Methods of Making the Same, of which the following is a specification.

I have discovered that casein or a casein compound combined with an alkaline salt of tannic acid produces in the presence of water a glue-like substance which possesses great adhesive power and which upon drying assumes a hard and tough consistency and becomes insoluble in water and various other liquids.

This adhesive casein can be produced from ordinary insoluble casein—for instance, the curd of skim-milk—or from a soluble casein compound—for instance, sodium casein—prepared from such curd. To produce this adhesive casein from ordinary insoluble casein, the latter is intimately mixed with an alkaline salt of tannic acid. I prefer a tannic salt of the alkaline earths or magnesia, and it is advantageous to employ a salt whose base is a solvent of casein, since the excess of the base aids in forming the adhesive solution or substance. I prefer the tannate of calcium because it is cheap and easily prepared. The tannates of other alkaline earths, of magnesia, of fixed alkalies, of ammonia, of baryta, and other compounds of tannin or tannin-like substances may, however, be employed.

To produce this adhesive casein in a commercial way, I prepare a solution containing tannic acid and then add lime, preferably in the form of milk of lime, in sufficient quantity to precipitate all the tannic acid and leave an excess of lime. The solution of tannic acid is conveniently made by boiling a bark containing tannic acid and straining the liquor. To the strained liquor is gradually added a clear solution of milk of lime until no more precipitate results and the free liquor reacts alkaline. The solution of tannic acid may be warmed before adding the milk of lime; but this is not essential. The precipitate is separated from the liquid and dried, preferably by an air-current at ordinary temperature, about 75° Fahrenheit. The dry resulting compound, which is essentially calcium tannate, is reduced to a powder, and if the latter does not contain an excess of lime I add a suitable quantity of powdered lime. The casein or casein compound is reduced to a powder and intimately mixed with the powdered calcium tannate. This can be conveniently effected by grinding the substances together and then passing the mixture through a sieve. For most purposes a suitable proportion is one part of tannate to ten parts of casein; but this proportion may be changed materially as the peculiarities of the ultimate product may require. In some cases equal parts of tannate and casein may be employed. This powdered mixture of casein and tannate is ready for use as an adhesive by simply mixing it with water to the desired consistency. The casein is not precipitated upon adding the water; but the mixture forms, with water, a glue-like viscous paste which possesses a very marked adhesive property. If desired, from five to ten per cent. of ammonia may be added to the water which is added to the powdered mixture. Ammonia facilitates and expedites the formation of the viscous solution. Upon drying this viscous substance it becomes hard, tough, and insoluble in water, petroleum, bisulfid of carbon, and many other liquids.

This adhesive casein can be used for a great variety of purposes. It can be used as an adhesive instead of glue and other common adhesives. It does not set or harden too quickly, and therefore affords ample opportunity for manipulating the parts or articles to which it is applied, and as it does not require to be heated for preparing it for use it is very convenient in use. It can be used as a lining for barrels for various purposes—for instance, petroleum-barrels. When applied to a well-dried warmed barrel, it strikes readily into the wood and forms a perfect lining. It can be used for producing a substitute for leather by mixing it with water to a cream-like consistency, adding glycerin, and then applying the paste to a backing—for instance, of canvas—or the paste may first be applied to the backing and then the glycerin may be worked into the surface. The latter can be calendered or embossed. Coloring-pigments may be added to the paste, if desired. In this way a substitute for linoleum can be produced which is suitable for covering floors and which can be washed with soap and water. A substance suitable for use as a poor conductor of heat may be made by mixing asbestos or other suitable mineral or other fibrous or comminuted solid matter with the paste. About equal parts of mineral or fibrous matter and casein compound will make a good mixture. This mixture can be put upon the market in a dry state and requires only to be mixed with water for forming a non-conducting paint or paste suitable for direct application to the pipes or surfaces which are to be protected and to which it adheres firmly. Comminuted mineral matter mixed with the dry compound and water to a putty-like consistency produces upon drying a horn-like, hard, and tough water-resisting substance. A water-resisting paint may be made by mixing the adhesive matter with a suitable comminuted mineral matter and a coloring-matter. This paint may be sold as a dry powder and is prepared for use by adding cold water.

A diluted solution of this adhesive casein forms an excellent size for wall-plaster preparatory to painting. It possesses the important advantage that it is not affected by the moisture of wet walls. All paints adhere firmly to this size.

This adhesive casein retards the setting of plaster-of-paris and is therefore useful as a restrainer in plastering compositions. The casein compound may be added to the water with which the plaster-of-paris is mixed or to the dry chemical ingredients of a plastering composition. One part of this casein compound may be used with from one hundred to five hundred parts of plaster-of-paris, according to the longer or shorter retardation which is desired.

This adhesive casein is produced very cheaply from skim-milk, which is practically a waste material, having at present little or no value, as it is produced in vast quantities, for which there is no market.

I claim as my invention—

1. The herein-described composition of matter consisting of casein and an alkaline salt of tannic acid, said composition forming with water an adhesive substance and becoming hard and water-resisting upon drying, substantially as set forth.

2. The herein-described method of producing an adhesive substance from casein which consists in combining with casein an alkaline salt of tannic acid and adding water, substantially as set forth.

Witness my hand this 15th day of April, 1901.

JOHN A. JUST.

Witnesses;
EDWD. A. CONKEY,
DANIEL H. STRACHAN.